United States Patent [19] [11] 4,213,838
Lowther [45] Jul. 22, 1980

[54] CORONA REACTION SYSTEM

[75] Inventor: Frank E. Lowther, Buffalo, N.Y.

[73] Assignee: Union Carbide Corporation, New York, N.Y.

[21] Appl. No.: 28,451

[22] Filed: Apr. 9, 1979

Related U.S. Application Data

[60] Division of Ser. No. 857,512, Dec. 5, 1977, Pat. No. 4,159,425, which is a continuation-in-part of Ser. No. 738,181, Nov. 2, 1976, which is a continuation-in-part of Ser. No. 632,620, Nov. 17, 1975, abandoned, which is a continuation-in-part of Ser. No. 509,278, Sep. 25, 1974, abandoned, which is a continuation-in-part of Ser. No. 387,972, Aug. 13, 1973, abandoned, said Ser. No. 738,181, is a continuation-in-part of Ser. No. 579,739, Feb. 20, 1975, Pat. No. 3,996,122, which is a division of Ser. No. 387,972, Aug. 13, 1973, abandoned.

[51] Int. Cl.² .............................................. C01B 13/11
[52] U.S. Cl. ..................................................... 204/176
[58] Field of Search ......................................... 204/176

[56] References Cited

U.S. PATENT DOCUMENTS

| 3,551,321 | 12/1970 | Guillerd et al. | 204/176 X |
| 3,663,418 | 5/1972 | Kawahata | 250/533 |
| 3,833,492 | 9/1974 | Bollyky | 204/176 |
| 3,872,313 | 3/1975 | Emigh et al. | 250/541 |
| 3,996,122 | 12/1976 | Lowther | 204/176 |

FOREIGN PATENT DOCUMENTS 689301 6/1964 Canada .................................... 204/176

Primary Examiner—F. C. Edmundson
Attorney, Agent, or Firm—Steven J. Hultquist

[57] ABSTRACT

A corona reaction system of the type wherein substantially all of the heat generated by corona discharge is removed from the system by gas flow therethrough. A corona discharge gas flow path is provided which is between 2.0 and 10 inches in length and bounded by discharge electrodes spaced apart at a distance of between 0.01 and 0.250 inch, whereby low pressure drop over the gas flow path is maintained under conditions of high power density and gas temperature.

9 Claims, 4 Drawing Figures

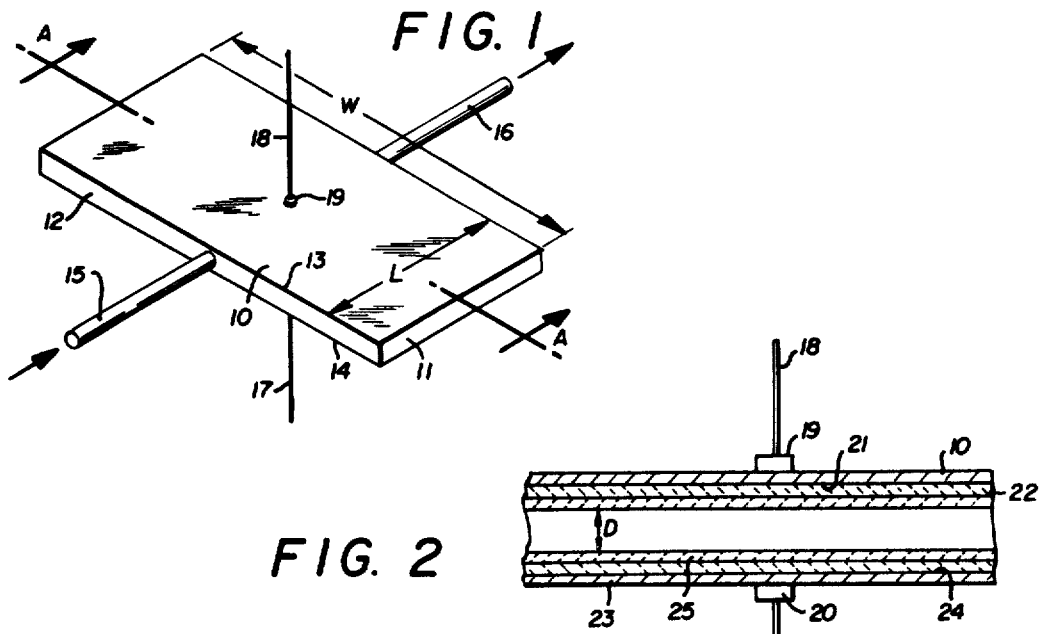
FIG. 1
FIG. 2
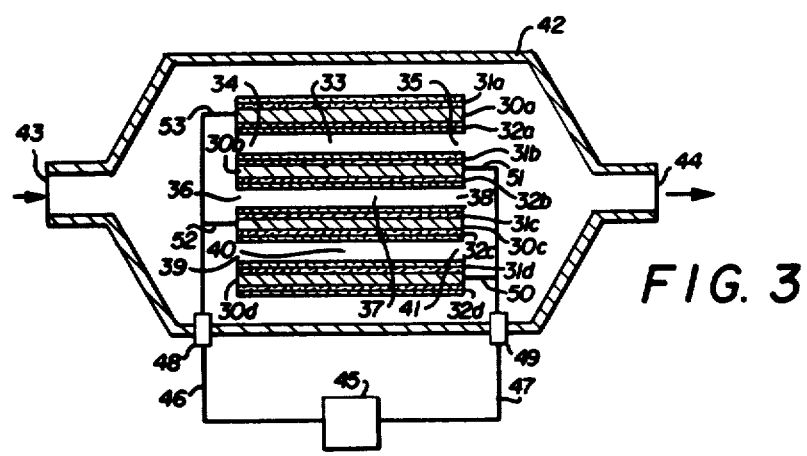
FIG. 3
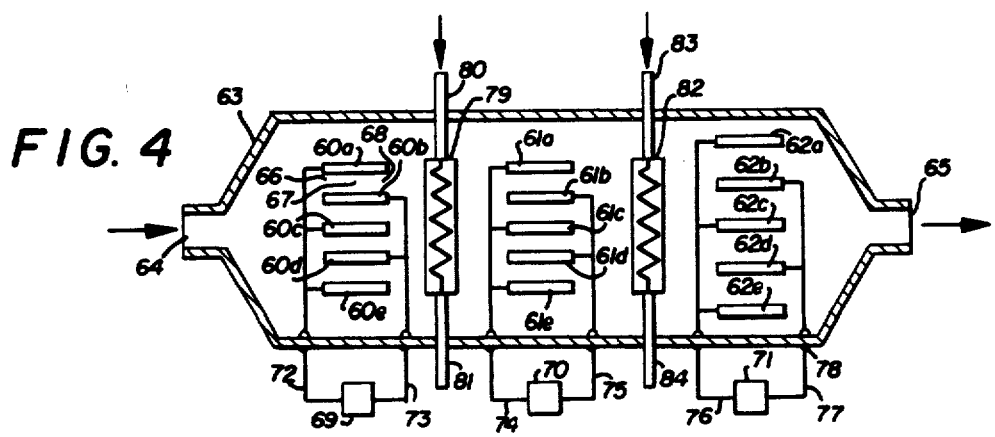
FIG. 4

CORONA REACTION SYSTEM

CROSS-REFERENCE TO RELATED APPLICATIONS

This application is a division of my prior U.S. application Ser. No. 857,512, filed Dec. 5, 1977, now U.S. Pat. No. 4,159,425, which is a continuation-in-part of U.S. application Ser. No. 738,181 filed Nov. 2, 1976, which is a continuation-in-part of U.S. application Ser. No. 632,620 filed Nov. 17, 1975, now abandoned, which is a continuation-in-part of U.S. application Ser. No. 509,278 filed Sept. 25, 1974, now abandoned, which is in turn a continuation-in-part of U.S. application Ser. No. 387,972 filed Aug. 13, 1973, now abandoned. U.S. application Ser. No. 738,181 is also a continuation-in-part of U.S. application Ser. No. 579,739 filed Feb. 20, 1975, now U.S. Pat. No. 3,996,122, which is a division of U.S. application Ser. No. 387,972 filed Aug. 13, 1973.

BACKGROUND OF THE INVENTION

1. Field of the Invention

The present invention relates generally to corona reaction systems and more specifically to corona generators which utilize the reactant gas stream for removing substantially all of the waste heat from the corona discharge gas flow path.

2. Description of the Prior Art

It is generally known that corona generators may be used to induce a variety of chemical reactions. In particular, corona generators have long been used to produce ozone from oxygen. The quantity of ozone or other product produced in a given generator will depend upon many parameters such as oxygen or reactant gas concentration, electric power applied, temperature, gas flow rate, and so forth.

It has been recently proposed that by maximizing the gas flow rate through a corona generator, the waste heat may be rejected in the reactant gas stream while maintaining the temperature of the reactant gas at a tolerable level. In this manner the need is eliminated for a heat exchanger containing a second head absorbing fluid, coextensive and contiguous with the corona and electrodes. Such heat exchangers are bulky and expensive and greatly complicate the design and construction of the corona generator. In the production of ozone in particular, it is extremely critical that the reactant gas temperature be maintained at a relatively low level so as to inhibit the decomposition of ozone and to maintain a reasonable dielectric life. Accordingly, if a large flow of reactant gas is utilized, it is found that the reaction temperature within the corona generator device may be maintained at a temperature below which tolerable amounts of ozone reversibly react to form oxygen. However, it has recently been found that when relatively weak dielectrics such as glass are employed, the volumes of gas needed to avoid temperature destructive to the dielectric are very large and the long restrictive gas passages conventionally employed create or contribute to an undue pressure drop through the device.

An example of corona generators of the above type wherein substantially all of the heat generated by corona discharge is removed from the generator by gas flow therethrough is described in Canadian Pat. No. 689,301 to Ewing et al. This reference describes an ozone generator employing flat plate electrodes 24 inches by 24 inches square with a glass dielectric having a dielectric strength of about 500 volts/mil based on a maximum permissible operating temperature of about 200° F. Ewing et al discloses a specific example using a power density of 20 watts/ft$^2$, a gap height of 2 mm, and a final product of 1.5 wt.% O$_3$ obtained in six generator stages.

Operation in the manner taught by Ewing et al has certain disadvantages. First, the pressure drop is so low that uniform flow distribution through the corona discharge gap is not obtained. The gas tends to channel through certain areas of the gap, and becomes stagnant in others. Ozone production is substantially less than that which would be obtained in the absence of such aberrant flow phenomena. Second, the ozone production per unit electrode area, whether actual or predicted on the basis of theoretical considerations, is very low and well below the yield per unit area obtained with the well-known water-cooled, glass tube electrode corona generators. It should be noted that Ewing et al cannot increase the oxygen flow rate without sustaining a corresponding reduction in ozone concentration. For example, if the flow were increased to 100 lbs O$_2$/hr, the concentration gradient across the corona discharge zone would decrease to approximately 0.02%, and about 75 generator stages would be needed in order to reach an ozone concentration of 1.5% in the final product. Whereas this is possible theoretically, it is impractical for commercial use, and as a result, the teachings of Ewing et al have not been usefully applied.

Ewing et al also suggests that power density can be increased to 200 watts/ft$^2$. At such power density values, and based on the same concentration gradient values across the ozone generator as mentioned above, flow, pressure drop and ozone production are correspondingly increased. Thus, the higher power density improves ozone production considerably over the 20 watts/ft$^2$ case, but the yield is still not significantly better than achievable with water-cooled, glass tube electrode systems. Moreover, the application of 200 watts/ft$^2$ in reality exceeds the practical operating limit for glass and similar materials, whose dielectric strength is on the order of 500 volts/mil. With such dielectrics, experience has shown that even at 90 watts/ft$^2$ the failure rate of glass dielectrics is prohibitively high for commercial practice. It is for this reason, low dielectric strength, that the water-cooled, glass tube systems normally operate in the range 20–90 watts/ft$^2$ in order to achieve a balance between reliability, reasonable ozone yields and low dielectric failure rates.

One of ordinary skill might conclude that capability of the system disclosed in the Ewing et al patent for efficient operation at high power density levels might be marginally improved by employing recently developed porcelain enamel dielectric materials such as are disclosed for example in U.S. Pat. No. 3,891,561 issued Sept. 7, 1973 to F. E. Lowther. According to the Lowther patent, the specific dielectric materials therein disclosed permit operation at power densities of 1.8 watts/in$^2$ or about 260 watts/ft$^2$, compared to the 200 watts/ft$^2$ taught by Ewing et al. Although such combination, of the Lowther dielectric in the Ewing et al corona generator, permits operation at reasonable gas flow rate and pressure drop conditions, the ozone yield efficiency for this system is still little better than that achieved by the prior art glass tube ozone generators. Nonetheless, it has recently been found that the dielectric material disclosed in the Lowther patent has a substantially higher power density capability than the 260 watt/ft² power density level disclosed in the patent. Experience has shown that power densities of 1000 watts/ft² and higher can be transmitted across such dielectric for extended periods of operation without failure. Unfortunately, however, this capability cannot be realized in ozone generators of a type as disclosed in the Ewing et al patent without encountering prohibitively high pressure drop across the generator.

Another type of prior art ozone generator which does not employ discrete heat exchangers contiguous to the electrode or gap is the small odor-control corona discharge device conventionally used for space conditioning. Typically such devices consist of paired screen electrodes each on the order of 1 inch square, each forming a discharge gap with a mica dielectric interposed between the screen electrodes. Air is blown at a very high velocity through the gap and across the exposed electrode surfaces—the flow rate being sufficient to produce less than 1 ppm ($<0.0001\%$) ozone in the air discharge. Such concentration levels cannot be exceeded because of toxicity considerations.

The above odor-control devices are not concerned with high ozone yield or with high efficiency. Corona power is extremely low, and any dielectric capable of sustaining low minimal sparking voltages will suffice. Heat generation and high temperatures are not a problem regardless of electrode size because the gaps formed between the dielectric and the adjacent sides of each electrode are fully exposed to ambient air. Thus, the dielectric is effectively and adequately cooled by convection and radiation from the electrode surface.

Accordingly, it is an object of the present invention to provide an improved corona reaction system in which heat generated by corona discharge in the reaction system is removed by the reactant gas stream.

It is a further object to provide an ozone generator which is capable of processing large quantities of oxygen-containing feed gas with minimum pressure drop across the generator.

It is still another object to provide an ozone generator which is capable of efficiently producing large yields of ozone.

Other objects and advantages of the invention will be apparent from the ensuing disclosure and appended claims.

SUMMARY OF THE INVENTION

This invention relates to means for and method of generating corona by corona discharge.

The apparatus aspect of the invention relates to a corona generator of the type wherein substantially all of the heat generated by corona discharge is removed from the generator by gas flow therethrough. The generator includes a pair of coextensively aligned, closely spaced-apart electrodes. Means are provided for defining an enclosed gas flow path between the electrodes along the length thereof with an inlet bounded by the adjacent width edges of the electrodes at one end and an outlet bounded by the adjacent width edges of the electrodes at the other end, with internal facing surfaces therebetween. The apparatus also includes means for introducing feed gas to the inlet of the gas flow path and discharging reacted gas at the outlet end thereof. The electrodes are between 2.0 and 10 inches in length and are spaced apart at distance of between 0.01 and 0.250 inch. A dielectric material coating is provided on the electrode internal facing surfaces having substantially uniform thickness of between 1 and 20 mils.

The method aspect of the invention relates to generating ozone by corona discharge. In the method, a corona discharge gas flow path is provided between 2.0 and 10 inches in length, bounded by discharge electrodes spaced apart at distance of between 0.01 and 0.250 inch. Substantially uniform corona is generated along the length of the gas flow path at power density of between 3.5 and 33 watts/in² of electrode surface area. An oxygen-containing gas is flowed along the corona discharge gas flow path from the inlet end to the outlet end thereof for the aforementioned ozone generation, at flow rate sufficient for the gas flow to remove substantially all of the heat generated by the corona discharge from the gas flow path. Ozone-containing gas is discharged from the outlet end of the gas flow path, such that the pressure drop over the gas flow path is maintained between 0.1 and 2 lbs/in².

As used herein the phrase "wherein substantially all of the heat generated by corona discharge is removed from the generator by gas flow therethrough", or similar language, is intended to mean that a large major fraction, at least 80%, of the heat generated by corona discharge is removed from the gas flow path of the corona generator by the gas flow along the path.

The present invention is based on the discovery that considerable benefit may be obtained if a corona discharge gas flow path bounded by closely spaced discharge electrodes is constructed such that the length dimension in the direction of gas flow along the gas flow path is small in comparison to the gas flow path length dimensions of the prior art. In particular it has been found that if the gas flow path length is between 2.0 and 10 inches and preferably between 2 and 5 inches the corona generation may be carried out stably and economically using a high rate of gas flow. In turn a high gas flow rate results in the maintenance of a low reactant gas temperature without significant or major dependence upon gas-solid heat exchange along the gas flow path. Low reactant gas temperature can thus be maintained along the gas flow path, preferably below about 300° C. and more preferably on the order of from about 50° to 100° C. Decomposition of heat-sensitive reactants, for example, ozone, is significantly reduced by maintenance of such low reaction temperatures. By removing the necessity for providing discrete heat exchange means along the gas flow path or contiguous thereto a far more compact generator is obtained which is much lower in cost and simpler to construct than the generators heretofore employed for corona reaction.

As used herein, the terms "electrode length" and "gas flow path length" refer to electrode length and gas flow path length in a single corona generator. In a single corona generator, the gas flow path may be bounded by a plurality of successive electrode pairs serially spaced along the gas flow path or, alternatively, by a single pair of spaced-apart electrodes extending along and defining the gas flow path. In the former instance, when the gas flow path is bounded by a plurality of successive electrode pairs serially spaced along the gas flow path, the electrode length defining the gas flow path length is the aggregate sum of the lengths of the constituent electrodes. For a single corona generator, the overall electrode length in accordance with this invention is in the range of 2 to 10 inches. In this context, a single corona generator is taken as referring to a corona generator which is characterized by adiabatic operation (i.e., heat is not being rejected to any fluid medium except the gas flowing through the corona generator), uniform electrode spacing and a uniform power supply means.

BRIEF DESCRIPTION OF THE DRAWINGS

FIG. 1 is a perspective view of a corona generator according to the present invention;

FIG. 2 is a cross-sectional view of a segment of the corona generator of FIG. 1 taken through line A—A;

FIG. 3 is a cross-sectional view of a corona generator according to the present invention comprising four stacked electrodes alternating with corona discharge gas flow paths; and FIG. 4 is a cross-sectional view of a corona generating system according to the present invention comprising three corona generators with heat exchange means interposed between adjacent corona generators, wherein each generator consists of five stacked electrodes alternating with corona discharge gas flow paths.

DETAILED DESCRIPTION OF THE PREFERRED EMBODIMENTS

Referring now to the drawings, FIG. 1 shows an illustrative corona generator according to the present invention. This corona generator comprises a pair of closely spaced apart electrodes 10 and 23 which are coextensively aligned with respect to each other over their length L and width W dimensions. Associated with the electrode pair are side walls 11 and transverse end walls 12, which serve as enclosure members to define an enclosed gas flow path between the electrodes along the length thereof. The enclosed gas flow path has an inlet bounded by the adjacent width edges 13 and 14 of the respective electrodes at one end and an outlet bounded by the adjacent width edges of the respective electrodes at the other end, with internal facing surfaces of the respective electrodes therebetween. The electrodes are parallelly aligned with respect to each other and as shown have a greater width W than length L. Such configuration, wherein the electrodes have a greater width than length, is preferred in the practice of the present invention, for the reason that the advantages of the invention—i.e., the capability of maintaining low pressure drops across the generator under conditions of (1) high electrode surface power density, as employed for high intensity corona reaction, and (2) high gas flows through the generator for removal of the heat therefrom which is generated under the aforementioned high power density conditions—are particularly effectively realized in this high aspect ratio (ratio of corona discharge gas flow path bounding electrode's width to its length) configuration. As used in this context, high aspect ratio is intended to mean an electrode width to length ratio of greater than one. Inasmuch as the discharge electrodes bounding the corona discharge gas flow path according to the present invention are coextensively aligned, i.e., the electrodes are spatially extended to the same dimensional extent across their respective facing surfaces, the numerical value of the electrode aspect ratio is numerically equal to the aspect width to length ratio of the corona discharge gas flow path when the electrodes are planar and parallelly aligned. Accordingly, the term aspect ratio as applied to corona generator configurations of a type as shown in FIG. 1 is to be understood as referring to both the corona discharge gas flow path and the discharge electrodes bounding the gas flow path.

In the FIG. 1 embodiment of the invention the feed gas conduit 15 introduces feed gas to the inlet of the gas flow path and the discharge conduit 16 discharges the reacted gas at the outlet end of the gas flow path. The discharge electrodes 10 and 23 are each between 2.0 and 10 inches and preferably between 2 and 5 inches in length and are spaced apart at a distance of between 0.01 and 0.250 inch. On the internal facing surfaces of the discharge electrodes of dielectric material coating is provided having substantially uniform thickness of between 1 and 20 mils. A particularly preferred dielectric material is porcelain enamel, preferably of a type as disclosed in U.S. Pat. Nos. 3,891,561 and 3,903,426 to F. E. Lowther, having a dielectric constant of at least 5. Power is supplied to the discharge electrodes of the corona generator by supplying means including electrical conduits 17 and 18 which are connected to the discharge electrodes by means of insulated bushings 19.

In operation, the preferred use of the corona generator of this invention is in the generation of ozone because of the remarkable capability of this generator to remove the extremely large amounts of waste heat which are characteristic of ozone generation under high power density conditions favorable to high ozone yield. Nonetheless, although the preferred use of the present invention is in the generation of ozone, it is to be understood that other reactants can be subjected to corona discharge in the corona generator of this invention to produce various reaction products. As an example, the corona generator of this invention can be employed for corona reaction of methane or other hydrocarbon species to form acetylene and hydrogen reaction products.

The method of generating ozone by corona discharge according to the present invention will now be described with reference to the corona generator of FIG. 1. As mentioned hereinabove, the corona discharge gas flow path of this invention is between 2.0 and 10 inches in length and is bounded by discharge electrodes spaced apart at distance of between 0.01 and 0.250 inch. Substantially uniform corona is generated along the length L of the gas flow path at power density of between 3.5 and 33 watts/ft$^2$ of electrode surface area. As used in this context, to denote the electrode area over which the corona generating power is applied for corona discharge, the term "electrode surface area" means the internal facing surface area of one of the pair of coextensively aligned discharge electrodes bounding the corona discharge gas flow path. The term "power" means average power supplied to the discharge electrodes for corona discharge during the period of operation. Thus, in the FIG. 1 generator, the power density as thus defined would be equal to the average power supplied to the discharge electrodes during the period of operation divided by the quantity (L×W), which is the internal facing surface area of each of the electrodes 10 and 23 in the electrode pair.

An oxygen-containing gas, such as air, air enriched in oxygen, or substantially pure oxygen gas, is introduced to the gas flow path by feed gas conduit 15 and flowed along the corona discharge gas flow path bounded by the discharge electrodes 10 and 23, side walls 11 and end walls 12. The gas is flowed along the gas flow path from the inlet end to the outlet end thereof for ozone generation at a flow rate sufficient for the gas flow to remove substantially all of the heat generated by the corona discharge from the gas flow path. Ozone-containing gas is discharged from the outlet end of the corona discharge gas flow path by discharge conduit 16. The gas flow through the corona generator is conducted at a rate such that the pressure drop over the gas flow path is maintained between 0.1 and 2.0 lbs./in$^2$.

As indicated above, the power density in the ozone-generating method of this invention is maintained at a value of between 3.5 and 33 watts/in$^2$ of electrode surface area (=504 and 4752 watts/ft$^2$ of electrode surface area) along the corona discharge gas flow path. Such power density levels may suitably be provided by power supply means of conventional type well known to those skilled in the art. The power supply means preferably provides a voltage across the discharge electrodes of the corona generator on the order of between 2,600 and 75,000 volts. As used herein, all numerical values of voltage will be understood to refer to peak voltage values. The frequency of the applied voltage may suitably vary from between about 60 cycles per second and 100,000 cycles per second. This numerical range of frequency broadly includes frequency waveforms which are regular and continuous in form, as well as waveforms produced by intermittent pulsing of solid-state SCR power supply circuits which are characterized by a close clustering of sharp wave peaks, known as a "burst", separated by wave portions of constant low or zero amplitude which are associated with relaxation of the SCR device. As applied to this latter type of waveform, the term "frequency in cycles per second", as used herein, is intended to mean the number of such "bursts" per second. The power supply employed in the practice of the invention may suitably comprise a conventional 60 cycle AC power source which is stepped up to the desired voltage through a conventional transformer. In a particularly preferred practice of the present invention, power is supplied through a high frequency converter such as disclosed in U.S. Pat. No. 3,784,838 to F. E. Lowther.

The power density employed to generate corona along the length of the corona discharge gas flow path in the practice of this invention should not exceed about 33 watts/in$^2$ because at frequencies at the previously described high values on the order of 100,000 cycles per second, arcing is prone to occur across the narrow gap between the bounding discharge electrodes. Such arcing may result in puncturing of the dielectric and possible damage to the power supply equipment for the system. Continued arcing also results in high power consumption and low ozone production efficiency for the system. The previously mentioned solid state SCR power supply means are generally limited by present design considerations to production of power density levels on the order of about 11 watts/in$^2$ of electrode surface area and above this level vacuum tube power supply means are most advantageously employed.

The power density employed to generate corona in the practice of this invention should be maintained at a value of at least about 3.5 watts/in$^2$. In accordance with the present invention, high flow rates of gas are employed to remove substantially all of the waste heat from the corona discharge gas flow path, without reliance on heat exchange means in the corona generator or coextensive with the corona discharge gas flow path therein. Concomitant with such high gas flow rates, the gas flow path is short in length in order to avoid excessive pressure drop and resultant non-uniform corona discharge. With such corona generator characteristics, the power density must be relatively high, at least about 3.5 watts/in$^2$, in order to obtain reasonable production of ozone in the corona generator and thereby avoid the need to provide an impractically large number of such corona generators coupled in series in order to achieve useful or desirable ozone concentration levels in the final product ozone-containing gas. The foregoing may be shown by reference to the following equation for the corona generator:

$$\Delta c = \frac{WLP_A E}{10F}$$

in which $\Delta c$ = ozone concentration increase across the corona generator, wt. percent ozone;
  W = width of corona discharge gas flow path, inches;
  L = length of corona discharge gas flow path, inches;
  $P_A$ = power density, watts/sq.in. of electrode surface area;
  F = gas flow rate, pounds/hr.; and
  E = corona generator efficiency, pounds of ozone produced per kilowatt-hour of power consumed by the generator.

Thus, it is seen from the above relationship that for a corona discharge gas flow path of given width W, if the gas flow path length L is reduced and the gas flow rate F is increased, then the power density $P_A$ must be increased in order to maintain the ozone concentration gradient $\Delta c$ within reasonable limits.

Under the above discussed power density range of 3.5 to 33 watts/in$^2$ of electrode surface area, the voltage across the discharge electrodes of the corona generator is preferably maintained at a value of between 2,600 and 75,000 volts. Low voltages below about 2,600 volts are undesirable because the power density at such levels tends to decrease to unfavorably low values below about 3.5 watts/in$^2$ of electrode surface area. At such unfavorably low power density levels, the flow rate of oxygen-containing gas through the corona generator must be greatly reduced, in order to maintain suitable ozone concentrations in the final product gas, to flow rate levels at which nonuniform gas flow distribution tends to occur. If somewhat reduced concentration gradient across the corona generator is tolerable, as for example may be the case in some space conditioning applications, then electrode surface area might be increased to compensate for low voltage and thus maintain ozone yield for the corona generator at levels commensurate with good overall operating efficiency for the device. However, this results in excessively high current flows in the system which exceed the carrying capability of otherwise useful present level solid state power supplies.

Voltage levels below about 2600 volts should also be avoided because they approach the start voltage of the corona, which is the voltage at which the corona first begins to form as the voltage is raised from zero potential. The start voltage is a function of the product of the pressure of the gas flowed through the corona generator and the dimension of the discharge gap, i.e., the distance at which the discharge electrodes are spaced apart from each other along the corona discharge gas flow path. Low values of the start voltage thus are associated with very low gas pressures, with very narrow discharge gaps, or a combination of both. The disadvantages of very narrow discharge gaps is discussed in detail hereinafter. Very low pressures for the gas flowed through the corona generator are undesirable because the utility of the product ozone-containing gas is low unless it is compressed. Accordingly, if ozone-containing gas is produced at very low pressure, the gas must typically be compressed downstream of the corona generator for subsequent use. Such downstream gas compression is detrimental for the reason that heat of compression is thereby imparted to the gas and this heat causes rapid degradation of the ozone in the gas to oxygen.

As the peak voltage level applied to the discharge electrodes approaches the start voltage, the actual instantaneous voltage level will exceed the start voltage during only a very short portion of each power cycle. Thus, the corona is extinguished during the remaining larger portion of the cycle. Such operation substantially reduces the power which can be transmitted by the corona to the gas stream flowed through the corona generator and thus adversely affects the corona generating and ozone production capability of the system. For these reasons, it is preferred to generate corona in the practice of the present invention at a voltage of at least 2,600 volts.

On the other hand, voltage applied to the corona discharge electrodes should not exceed 75,000 volts since voltages in excess of that value are associated with disproportionately increased power supply equipment cost, system design complexity and electrical hazzard. Such upper limit voltage values can readily be accommodated by the thin dielectric materials employed in accordance with this invention, i.e., dielectric materials having substantially uniform between 1 and 20 mils.

The interior of the corona generator device of FIG. 1 is shown in FIG. 2, which is a segmented view of the device of FIG. 1 taken in cross-section along the line A—A. As shown in FIG. 2, the corona generator comprises an upper electrode 10 coated on its internal facing surface 21 with a dielectric material coating 22 and a lower electrode 23 similarly coated on its external facing surface 24 with a dielectric material coating 25. The upper electrical conduit 18 joins the upper electrode 10 through insulated bushing 19 and the lower electrical conduit 17 joins the lower electrode 23 through insulated bushing 20. As shown in the drawing, an electrical discharge gap is defined between the upper and lower dielectric coated electrodes. The distance between the internal facing surfaces of the dielectric coated electrodes is shown in FIG. 2 as the dimension D. As indicated earlier herein, this dimension D, which represents the electrode spacing, is between 0.01 and 0.250 inch in accordance with the present invention.

FIG. 3 is a cross-sectional view of a corona generator according to the present invention comprising four stacked electrodes alternating with corona discharge gas flow paths. The advantages of the present invention, whereby substantially all of the heat generated by corona discharge is removed from the generator by gas flow therethrough, are particularly effectively employed in the corona generator of FIG. 3. This is because the heat and temperature problems attendent corona reaction are especially severe when a multiplicity of electrodes are stacked one upon the other with alternating discharge gaps. With such a stacked electrode construction the capability of rejecting waste heat through the electrode to the surroundings by radiation and conduction is not present except in the outermost electrodes in the stack. Experience has shown that with stacked electrode construction, overheating and dielectric failure associated therewith does not occur in the outermost electrodes but always in the inner electrodes of the assembly. As a result the concept of using a high flow of gas to remove waste heat from the corona discharge gas flow paths is particularly usefully applied with at least four stacked electrodes and three alternating gaps, wherein one gap is completely "submerged" within the stack with neither bounding electrode exposed to ambient surroundings.

Referring now to FIG. 3, the stacked array of electrodes 30a, 30b, 30c and 30d form a plurality of electrode pairs, i.e., the pairs 30a–30b, 30b–30c and 30c–30d. In the stacked array each electrode in the interior thereof forms an electrode pair with each of the electrodes adjacent thereto. Each of the electrodes is between 2.0 and 10 inches in length and is spaced apart from adjacent electrodes at a distance between 0.01 and 0.250 inch. Each electrode 30a–d is coated on its upper and lower surfaces with a dielectric material 31a–d and 32a–d having substantially uniform thickness of between 1 and 20 mils, as for example 10 mils.

In this array, three paralled corona discharge gas flow paths 33, 37 and 40 are formed with the gas flow path inlets 34, 36 and 39 and the gas flow path outlets 35, 38 and 41 respectively, so that the inlets and outlets are bounded by the adjacent width edges of the electrodes at the respective opposite ends of the gas flow paths. The stacked array of electrodes is mounted in housing 42 so as to define the enclosed gas flow paths 33, 37 and 40 between the electrodes 30a–d. Gas is introduced to the inlets of the gas flow paths by the entrance passage 43 of housing 42 and reacted gas is discharged from the outlets of the gas flow paths by the discharge passage 44. Power is supplied to the stacked electrodes by power supply 45, electrical conduits 46 and 47 which enter the housing 42 through insulated bushings 48 and 49, respectively, and electrical branch lines 50, 51, 52 and 53 coupled respectively to the electrodes 30d, 30b, 30c and 30a.

FIG. 4 is a cross-sectional view of a corona generating system according to the present invention comprising three corona generators with heat exchange means interposed between adjacent corona generators, wherein each generator consists of five stacked electrodes alternating with corona discharge gas flow paths. The corona generators are corrected in series gas flow relationship in the housing 63 having entrance passage 64 and discharge passage 65. The first corona generator is mounted in proximity to the entrance opening 64 and comprises the stacked array of electrodes 60a–e forming the gas flow passages 67 with inlets 66 and outlets 68. Similarly, the second corona generator comprises the stacked array of electrodes 61a–e forming gas flow passages and the third corona generator comprises the stacked array of electrodes 62a–e forming gas flow passages. The electrodes in each of the generators are coated with dielectric material and spaced apart as described above in connection with the preceeding embodiments of FIGS. 1–3.

As shown, each corona generator in the series system has associated therewith its own separate power supply means. Thus, the power supply 69 and electrical conduits 72 and 73 connected thereto provide power to the first corona generator stacked array of electrodes, the power supply 70 and electrical conduits 74 and 75 provide power to the second corona generator stacked array of electrodes and the power supply 71 and electrical conduits 76 and 77 provide power to the third corona generator stacked array of electrodes. As illustrated, the electrical conduits enter the housing 63 for the generating system through insulated bushings 78. The FIG. 4 system represents a preferred embodiment of the invention with a plurality of corona generators connected in series gas flow relationship, comprising at least two separate means for supplying power to the discharge electrodes of the corona generators for corona discharge, wherein each of the power supply means provides power to at least one of the corona generators. Such provision permits the voltage impressed across the corona discharge gas flow paths to be varied in at least one of the corona discharge gas flow paths in the series. This may be desirable to compensate for pressure drop across the corona generators in the series. The intensity of the corona discharge along the gas flow path is a function of pressure of the gas flowed along the path. Thus, in the downstream corona generators in a series-connected generating system, the cumulative pressure drop may result in sufficiently lowered gas pressures and concomitantly changed corona intensity that it may be desirable to increase the voltage in one or more of the downstream generators, relative to the voltage levels maintained in the upstream generators, so as to maintain the corona intensity comparatively uniform along the corona generator gas flow paths in the series.

In the FIG. 4 generating system, heat exchange means are disposed between adjacent corona generators for cooling of reacted gas discharged from a corona generator to remove waste heat therefrom prior to its introduction to the next succeeding corona generator in the series. These means include heat exchanger 79 positioned between the first and second corona generators and heat exchanger 82 positioned between the second and third corona generators. Externally supplied coolant fluid is introduced to heat exchanger 79 by feed conduit 80 for passage therethrough in indirect heat exchange with gas discharged from the first corona generator and the resulting warmed coolant is discharged from the heat exchanger through discharge conduit 81. Similarly, coolant is introduced to heat exchanger 82 by feed conduit 83 and discharged therefrom by discharge conduit 84, to provide cooling for the gas discharged from the second corona generator.

It will be noted that the electrode spacing, i.e., the distance by which the electrodes bounding the corona discharge gas flow path are spaced apart, is greater for the third corona generator stacked electrode array than for the first and second corona generator stacked electrode arrays. Such modification, wherein the electrode spacing in the corona generators is non-uniform among the generators in the series, may be desirable for maintaining substantially uniform corona intensity along the sequential corona generator gas flow paths in the generating system. As discussed hereinabove, cumulative pressure drop in a series-connected corona generator system can result in changing of the corona intensity in the downstream corona generators. By increasing the electrode spacing in the downstream generators relative to the spacing in the upstream generators, the voltage applied to the corona discharge gas flow paths in the downstream generators can be increased, with the result that variation in the corona intensity among the generators in the series is minimized. In a preferred embodiment of the invention wherein series-connected corona generators are employed for ozone generation, the corona generating system is designed and operated so that the product of the pressure of the oxygen-containing gas along each corona discharge gas flow path and the electrode spacing for the gas flow path is maintained substantially constant in the series. This insures that the corona intensity is maintained at a uniform level along the corona discharge gas flow paths in the series.

In the operation of the corona generating system shown in FIG. 4 for ozone generation, substantially uniform corona is generated along the length of each gas flow path at power density of between 3.5 and 33 watts/in$^2$ of electrode surface area. Oxygen-containing gas is introduced into the system by inlet passage 64 and sequentially flowed along each of the corona discharge gas flow path in series from the inlet end to the outlet end of each for ozone generation at a flow rate sufficient for the gas flow to remove substantially all of the heat generated by the corona discharge from each gas flow path. Ozone-containing gas is discharged from the outlet end of each gas flow path and introduced to the next successive gas flow path in the series. Final ozone-containing gas is discharged from the outlet end of the final gas flow paths in the series and is passed out of the generating system through outlet passage 65. The gas flow through the generating system is controlled such that the pressure drop over each gas flow path in the series is maintained between 0.1 and 2.0 lbs/in$^2$. In the generating system, the ozone-containing gas is cooled between adjacent corona discharge gas flow paths in the series to remove heat generated along each gas flow path from the ozone-containing gas before flowing same along the next successive corona discharge gas flow path in the series.

The present invention is characterized by low lengths of corona discharge gas flow path along the direction of gas flow. Substantially all of the waste heat generated by corona discharge is removed from along the gas flow path by high gas flow rate and the flow path length must be short if excessive pressure drop and resulting non-uniform corona are to be avoided. If gas flow path length exceeds about 10 inches and substantially all heat is removed from the gas flow path by gas flow, then power density must be reduced to undesirably low levels in order to maintain pressure drop within tolerable limits, by correspondingly reducing the heat generated along the gas flow path, and the associated gas flow needed to remove this heat from the gas flow path. Preferably, the gas flow path length is not greater than 5 inches.

Corona discharge gas flow path length should not be less than about 2.0 inches in order to obtain reasonable increases in the reaction product concentration across the gas flow path with suitable power density levels and with a low number of discharge power density levels and with a low number of discharge electrodes for the corona generator. For example, the extent of corona reaction is a function of the product of power density and corona discharge electrode surface area ($= W \times L$, as shown in FIG. 1). As the gas flow path (electrode) length L becomes shorter, the power density and/or the gas flow path (electrode) width W must increase in order to maintain corona reaction at the same level. Power density cannot be increased without limit because dielectric failures will occur, resulting in arcing across the gap, and thus the gas flow path width must be increased in order to accommodate progressively lower values of gas flow path length. While the present invention contemplates the use of larger gas flow path widths relative to conventional corona generators, practical upper limits to the gas flow path width will be imposed by the cost and complexity of manufacture of the discharge electrodes bounding the gas flow path.

In accordance with the present invention, the discharge electrodes bounding the gas flow path are spaced apart at distance of between 0.01 inch and 0.250 inch. Electrode spacing should not be less than 0.01 inch because at such low values pressure drop through the corona generator tends to become excessively large and mechanical tolerances in electrode spacing become significant fractions of the total spacing dimension.

In general, for ozone production, an optimum value of the product of the pressure of the oxygen-containing gas along the corona discharge gas flow path and the electrode gap spacing for the flow path exists for each value of the operating voltage applied across the electrode gap. For a given applied voltage, the optimum pressure-gap dimension product corresponds to maximum power density and to maximum ozone production. Optimum values of gap height (corresponding to dimension D shown in FIG. 2) are given below in Table I for varying values of applied voltage and absolute gas pressure.

TABLE I

OPTIMUM ELECTRODE GAP SPACING FOR VARYING APPLIED VOLTAGE AND GAS PRESSURE CONDITIONS

| APPLIED VOLTAGE, VOLTS | GAS PRESSURE PSIA | ELECTRODE GAP SPACING MILS |
|---|---|---|
| 5,000–8,950 | 5 | 46–125 |
| 8,700–20,000 | 15 | 40–115 |
| 12,700–20,000 | 25 | 40–69 |

The electrode gap spacing should not exceed about 0.250 inch because of the above-mentioned relationship between pressure-gap product and voltage. The pressure-gap product determines the start voltage required to establish corona across the gap. For reasonable values of pressure, increasing the gap spacing will correspondingly increase the start voltage so that the latter approaches the applied voltage, as discussed in detail herein above. Based on these considerations, to effectively utilize the power supplied to the discharge electrodes for corona generation by maintaining the start voltage level suitably below the applied voltage, the electrode gap spacing should be maintained below about 0.250 inch.

In connection with the foregoing discussion, and under the broad practice of the present invention wherein electrodes having a length of between 2.0 and 10 inches are employed for ozone production from oxygen-containing gas, the ratio of the electrode length to the spacing between electrodes should be in the range of from 8 to 1000.

In general, for values of the ratio of electrode length to electrode spacing below 8, either the electrode length tends to become undesirably decreased or else the electrode spacing tends to become excessively large for efficient operation. In fact, ratio values of electrode length to electrode spacing below 8 tend to be associated with combinations of excessively short electrode lengths and excessively high electrode spacing. This combination results in unsuitably low pressure drop across the gas flow path or else requires excessively high power levels to maintain corona in the corona generator. In turn, low values of electrode length corresponding to electrode length to electrode spacing ratio values below 8 tend to be associated with undesirably low concentration differentials along the gas flow path, so that an unduly large number of stages are needed to reach suitable product concentration in the product gas from the system. The alternative for avoiding undesirably low concentration differentials is to employ power densities in the corona generator in excess of tolerance limits of the dielectric material on the electrodes.

If on the other hand the value of electrode length is suitably large while the overall ratio of electrode length to electrode spacing is below 8, then the value of electrode spacing tends to become too large for efficient operation. It has been established that dielectric strength in corona decreases with increasing electrode spacing. Thus, if the electrode spacing becomes too large, reasonable thickness of dielectric will be overstressed and will fail.

In addition to the foregoing, low ratio values of electrode length to electrode spacing below 8 are associated with pressure drop values along the gas flow path which are excessively low for uniform distribution of gas flow transversely across the flow path. This results in local "hot spots" in low-flow areas of the electrode surfaces which are then without any effective means for removing heat. The nonuniform residence time of gas within the gap also results in decomposition of product, excessive production of heat and unnecessary waste of power.

Another consequence of excessively low values of electrode length to electrode spacing, below 8, may be that the gas pressure is unduly low. In such situation the product will often require compression for final end use. Product compression may be disadvantageous for the reason that the heat of compression associated therewith may tend to decompose the product component. Such compression introduces additional mechanical complexity and expense into the overall system, and in some instances may require that the compressor is fabricated from expensive metal alloys, so that its internal surfaces are sufficiently resistant to corrosion from the ozone product.

For values of the ratio of the electrode length to electrode spacing above 1000, either the electrode length become excessively large or else the electrode spacing becomes excessively small for efficient operation. For excessively large values of electrode length the pressure drop along the gas flow path likewise becomes excessive causing non-uniform corona intensity along the gap with attendant drop in product yield. The elimination of this problem is a specific objective of this invention.

Furthermore, excessive electrode length is associated with unduly large values of concentration change along the gas flow path. Although at first glance such large concentration increases would appear to be advantageous, it has been found that the temperature rise along the gas flow path is proportional to the concentration rise. Therefore, when the concentration change becomes excessively large, there is also an excessive temperature rise along the gas flow path with consequent high temperatures at the outlet region of the gas flow path which may either exceed the temperature limit of the dielectric material or promote excessive decomposition of product. Excessive concentration rise along the flow path can be avoided by reducing the power density applied to the corona generator. However, this represents ineffective, uneconomic utilization of the production equipment.

If the electrode length is maintained at suitably low values with a ratio of the electrode length to electrode spacing of greater than 1000, the electrode spacing tends to become too small for efficient operation. At excessively low values of electrode spacing, the pressure drop along the gas flow path tends to become excessive, with aforementioned deleterious consequences. In addition, where the electrode spacing becomes too small, the mechanical tolerances in the spacing dimension become significant fractions of the total spacing dimension. This is disadvantageous for the reason that any minute variations in dielectric thickness will give rise to great deviations in dielectric stress together with significant non-uniformity of the corona field.

Based on the foregoing considerations the ratio of the length of the electrodes to the spacing between electrodes in the broad practice of the invention should be from 8 to 1000.

Under the invention, the pressure drop over the corona generator gas flow path is maintained between 0.1 and 2.0 lbs/in$^2$. The lower limit of 0.1 lb/in$^2$ is due to the requirement of uniform gas distribution and residence time for the gas introduced to the gas flow path, which is difficult to achieve at pressure drop values below such limit. The upper limit of 2.0 lbs/in$^2$ is imposed because at higher pressure drop values non-uniformity in the corona discharge is prone to occur, as a result of corona intensity variation with pressure level. As a practical matter, the total pressure drop across an ozone generating system, such as may include a plurality of series-connected ozone generators, is limited to a maximum value of about 10 lbs/in$^2$ in the interest of avoiding high levels of gas compression while maintaining sufficient static pressure to deliver the final ozone-containing product gas to end use facilities. Such total pressure drop limitation is readily satisfied with the short corona discharge gas flow path lengths of this invention without exceeding tolerable operating temperature limits, even when high ozone concentrations in the ozone-containing final product gas must be realized.

The dielectric material coating on the electrode internal facing surfaces in the corona generator of the invention has a substantially uniform thickness of between 1 and 20 mils. Within this range of thicknesses, the dielectric material coatings afford high capacitance and high power transmitting capabilities. The thickness of the dielectric should not exceed about 20 mils in order to obtain such power transmitting capability at reasonable voltages. In general, thicknesses exceeding 20 mils are expensive to provide and represent an excessive and needless resistance to the current flow. Also, heavy thicknesses exceeding about 20 mils tend to flake or spall when fired on or when subjected to high temperatures in service.

It is to be understood that the phrase "a dielectric material coating on the electrode internal facing surfaces" is intended to be broadly construed to include electrode pairs in which dielectric material coating is provided on surfaces of only one electrode in the pair as well as to electrode pairs in which dielectric material coating is provided on surfaces of both electrodes in the pair. In the latter case the separate coatings need not be equal in thickness but may differ considerably. The thickness of the dielectric material coating should be at least 1 mil so that minute flows or occlusions in the material do not extend through the thickness or occupy a significant fraction of the overall coating volume. The dielectric materials disclosed in U.S. Pat. No. 3,903,426 to F. E. Lowther are especially suitable in the practice of the present invention.

The specific dielectric material chosen for use should be tested to insure that its resistivity does not decay rapidly with temperature rise. If this occurs heat will be generated internally of the dielectric coating such that its temperature is substantially higher than that of the gas flowing through the corona. A dielectric material whose resistivity is highly sensitive to temperature will fail after comparatively short periods in service and are undesirable in the practice of the invention.

While the invention has been described hereinabove in connection with corona generator devices showing electrodes of generally planar configuration, it is also contemplated that the electrode surfaces may be non-planar, i.e., arcurate, in configuration. Hence, in one preferred embodiment of the present invention, the electrodes will be constructed in the form of concentric cylinders wherein the discharge electrode gas spacing is the radial dimension measured across the annular space between the two concentric cylinders. In accordance with the invention, the length of such cylinders is preferably short with respect to their overall width (diameter). This is in contrast to the conventional or normal application of cylindrical electrodes in corona generators which generally possess a large length to diameter ratio.

The advantages of the present invention relative to the corona generator devices of the prior art will now be illustratively shown by the various examples set forth below.

EXAMPLE I

In typical prior art corona generator devices, it is generally found that the length of the electrode surfaces is extremely high, normally on the order of from about 60 to 275 cm. (=23.6 to 108.3 inches). These high lengths are particularly widely employed in the prior art tube-type reactors, wherein the gas flows axially through an annular gap extending substantially the length of the tube. Such prior art devices are operated at relatively low gas flow rates, and the problem of pressure drop through the device becomes insignificant. Typically, low gas flow rates are utilized in order to obtain relatively high concentrations of ozone in the product. Temperature control is provided by substantial external cooling means such as a water jacket which extracts heat from the discharge gap radially through the dielectric and the outer electrode. If one were to attempt to impose high rates of gas flow on the long discharge gaps of these prior art devices, the resultant high pressure drop would create non-uniform corona along the gas flow path. While normal intense corona discharge would occur across some portions of the gas flow path, a weak discharge or no discharge at all would prevail across other portions thereof where the gas pressure would be low resulting in low corona intensity, as discussed hereinabove.

To illustrate a typical comparison of the present invention with the prior art, a corona generator device in accordance with the present invention was constructed which possessed the general structure set forth in FIGS. 1 and 2 of the drawing. The side and end walls of the enclosed gas flow path were fabricated from non-conductive polyvinylchloride resin sheet with a thickness of about 6 mm. The generator comprised two mild steel electrodes, the inner facing surfaces of which were coated with a porcelain enamel dielectric, having a thickness of 0.25 mm. The discharge electrode spacing dimension D was 1.0 mm, the width of the electrodes W was 60 cm (23.6 inches) and the length of the electrodes L was 20 cm (7.9 inches). The electrodes possessed a width to length aspect ratio of 3.0. A source of electrical power which provided a voltage of 9,000 volts at a frequency of 3,000 cycles per second was applied to the electrodes. A feed gas stream having an initial (inlet) temperature of 20° C. composed of 100 percent oxygen was passed through the device at various flow rates and pressures. The concentration of ozone in the exit gas was also measured.

A prior art type of device was constructed which possessed the same electrode surface area and gap spacing dimension as the above described generator according to the present invention. However, the length of the gas flow path in this second device was 60 mm (23.6 inches) and the width was 20 cm (7.9 inches) that is, with a width to length aspect ratio of 0.33. Performance data was generated during tests of both corona generator types, and this data is comparatively tabulated below in Table II.

Inspection of the data indicates that in the operation of both devices the quantity of ozone produced was substantially equal. However, it is noted that in the device of the present invention, that is, device I, the pressure drop through the corona generator was substantially less. It is obvious that if the savings in energy represented by the lower pressure drop achieved in the operation of the present device is applied to commercial practice a substantial economic saving is obtained. This is particularly true as the units are connected in gas series in order to increase ozone concentration, as disclosed in my U.S. application Ser. No. 387,972, filed Aug. 13, 1973.

As shown by the tabulated data, the prior art device, with an aspect ratio of 0.33 and a gap spacing of 1.5 mm, exhibited a pressure drop of approximately 0.15 atm (2.3 lbs/in$^2$) at a gas flow rate of 3.07 liters/sec through the device. Such flow rate is normally adequate to remove excessive heat from a gap of these dimensions without reliance upon external heat exchange through the electrodes. However, the pressure drop is excessive and incurs the risk of unstable corona discharge along the flow path.

On the other hand, if the width of the device is 60 cm (23.6 inches) and the length is 20 cm (7.9 inches), in accordance with the present invention, a pressure drop of only about 0.02 atm ozone production will be impaired, and the present invention will achieve an improvement in ozone yield.

In summary, it is found that among corona generator devices possessing equal electrode surface areas and discharge gaps, but different lengths in direction of gas flow, the device having the shorter lengths characteristic of the present invention will create substantially less pressure drop than the device having the longer dimension with respect to gas flow. The lower flow resistance of the corona discharge gas flow path permits the gas flow rate to be sufficiently high to remove the waste heat via the reactant gas stream at desirably low temperature. Surprisingly this advantage is obtained without incurring any loss in ozone production or any penalty in power consumption.

EXAMPLE II

In this example, comparison was made between the corona generator of the present invention and various prior art devices, in application to the production of ozone from an oxygen-containing feed gas. Specifically, ozone yields from the corona generators, in lbs $O_3$/hr $\times$ ft$^2$ electrode surface area), and pressure drop, in lbs/in$^2$, were compared in various cases. Each of the six cases evaluated will now be described.

Case 1 represents the ozone generator designed and operated in accordance with the teachings of Canadian Pat. No. 689,301, employing flat plate electrodes 24 inches by 24 inches square and operating at an oxygen feed gas flow of 10.7 lbs/hr and a typical power density, as taught by the patent, of 20 watts/ft$^2$ electrode surface area ($=0.139$ watts/in$^2$ electrode surface area).

Case 2 is based on the ozone generator of case 1 operating at the higher oxygen feed gas flow rate of 106.7 lbs/hr consonant with the higher power density of 200 watts/ft$^2$ ($=1.39$ watts/in$^2$), which is the upper limit power density value taught by the Canadian patent.

Case 3 represents the ozone generator of Canadian Pat. No. 689,301 employing the porcelain enamel dielectric material disclosed in U.S. Pat. No. 3,891,561 to F. E. Lowther operating at 260 watts/ft$^2$ ($=1.80$ watts/in$^2$), which is a power density value illustratively taught by the Lowther patent as being suitable for the disclosed dielectric material, and the correspondingly increased oxygen flow rate of 138.2 lbs/hr.

Case 4 is based on the ozone generator of Case 3 operating at the higher power density level of 1000 watts/ft$^2$ ($=7$ watts/in$^2$) which the Lowther dielectric material of U.S. Pat. No. 3,891,561 has been found to tolerate and the consistently increased oxygen flow rate

TABLE II

| Device No. | W/L Aspect Ratio | Pressure in (atm) | Pressure out (atm) | Pressure Drop (atm) | Flow Rate (l/sec.) | $O_3$ Conc. wt.% | $O_3$ Produced (kg/hr) | Exit Temp. (°C.) |
|---|---|---|---|---|---|---|---|---|
| I | 3.0 | 2.02 | 2.00 | 0.02 | 3.07 | 0.5 | 0.072 | 90 |
| II | 0.33 | 2.02 | 1.87 | 0.15 | 3.07 | 0.5 | 0.072 | 89 |

(0.25 lbs/in$^2$) is experienced under similar operating conditions. Thus heat removal via the reactant gas is achieved with a low pressure drop well below the threshold of instability. It is to be noted that the electrode surface area is the same as provided in the previously described prior art device and with equal power input the amount of ozone produced is theoretically the same. To the extent that high pressure drop corona instability occurs in the prior art apparatus, however, of 533 lbs/hr.

Case 5 represents an ozone generator constructed in accordance with the present invention having electrodes 6 inches long and 96 inches wide, operating at an oxygen flow rate of 799.5 lbs/hr and the same power density level of Case 4.

Case 6 also represents an ozone generator constructed in accordance with the present invention having electrodes 4 inches long and 144 inches wide, operating at an oxygen feed gas flow rate of 2400 lbs/hr and a power density of 3,000 watts/ft$^2$ (=21 watts/in$^2$).

The electrode surface area in all Cases 1–6 was identical at 576 inches$^2$. The tabulated data for this comparative evaluation is set forth below in Table III.

TABLE III

| Case | Electrode Area in | Electrode Length in. | Electrode Width in. | Power Density Watts/in$^2$ | Oxygen Flow Rate lbs/hr. | Ozone Yield lbs/ft$^2$ × hr. | Pressure Drop psi |
|---|---|---|---|---|---|---|---|
| 1 | 576 | 24 | 24 | 0.139 | 10.7 | .007 | .10 |
| 2 | 576 | 24 | 24 | 1.39 | 106.7 | .067 | 1.0 |
| 3 | 576 | 24 | 24 | 1.80 | 138.2 | .086 | 1.3 |
| 4 | 576 | 24 | 24 | 6.94 | 533.0 | .33 | 5.0 |
| 5 | 576 | 6 | 96 | 6.94 | 799.5 | .50 | .47 |
| 6 | 576 | 4 | 144 | 20.83 | 2400. | 1.50 | .63 |

Note:
Cases 1–4 based on ozone production efficiency of 3 kilowatt-hr/lb.O$_3$;
Cases 5–6 on 2 kilowatt-hr/lb.O$_3$ The values in Table III show that the Case 1 system disclosed in the Canadian patent to Ewing et al can operate with a comparatively low pressure drop but the ozone yield associated therewith, 0.007 lbs/(ft$^2$×hr), is well below the yield obtained with the well-known water-cooled glass tube electrode corona generator. Even by increasing the power density in the Ewing et al system in Case 2 by a factor of ten relative to the Case 1 operating level, the ozone yield is still not significantly improved over the prior art water cooled glass tube generator, nor is such improvement obtained in Case 3 wherein the same generator with the Lowther ceramic dielectric employed therein is operated at the marginally increased power density level of 1.8 watts/in$^2$. In Case 4, the Case 3 system is operated at 6.94 watts/in$^2$ power density; the result is a high ozone yield of 0.33 lbs/ft$^2$×hr., but such yield is achieved at the expense of a prohibitively high pressure drop of 5.0 lb/in$^2$. Case 5 shows the benefit of a corona generator according to the present invention, operating at the same power density as the Case 4 system, but with significantly higher ozone yield (0.50 versus 0.33 lbs/(ft$^2$×hr) for Case 4) and substantially lower pressure drop (0.47 versus 5.0 lb/in$^2$ for Case 4). Similarly, Case 6, representative of the present invention, employs the same electrode surface area to yield 1.50 lb/(ft$^2$×hr) of ozone with a suitably low pressure drop over the corona discharge gas flow path of 0.63 lb/in$^2$.

The foregoing results show the advantages achieved by the present invention relative to the corona generators of the prior art. The corona generator of the present invention provides a gas flow path configuration which unexpectedly permits high power density levels on the order of between 3.5 and 33 watts/in$^2$ of electrode surface area to be employed for corona generation without the necessity for large and bulky heat exchangers coextensive and contiguous with the corona discharge electrodes despite the generation of large amounts of waste heat attendant to operation of the corona generator at such high power density levels.

Although preferred embodiments of the invention have been described in detail, it is to be recognized that other embodiments only with modification of the disclosed features are contemplated as being within the scope of the invention.

What is claimed is:

1. A method for generating ozone by corona discharge, comprising the steps of:
   (a) providing a corona discharge gas flow path between 2.0 and 10 inches in length, bounded by discharge electrodes spaced apart at distance of between 0.01 and 0.250 inch;
   (b) generating substantially uniform corona along the length of said gas flow path at power density of between 3.5 and 33 watts/in$^2$ of electrode surface area; and
   (c) flowing an oxygen-containing gas along said corona discharge gas flow path from the inlet end to the outlet end thereof for said ozone generation, at flow rate sufficient for the gas flow to remove substantially all of the heat generated by said corona discharge from said gas flow path, and discharging ozone-containing gas from said outlet end of said gas flow path, such that the pressure drop over said gas flow path is maintained between 0.1 and 2 lbs/in$^2$.

2. A method according to claim 1 wherein said corona is generated at voltage of between 2600 and 75,000 volts and frequency of between 60 and 100,000 cycles per second.

3. A method according to claim 1 wherein the length of said gas flow path is between 2 and 5 inches.

4. A method according to claim 1 wherein said oxygen-containing gas is flowed sequentially along a plurality of series-connected corona discharge gas flow paths as described in (a), in accordance with steps (b) and (c).

5. A method according to claim 4 wherein voltage is varied in at least one of said corona discharge gas flow paths in the series.

6. A method according to claim 4 wherein the product of the pressure of said oxygen-containing gas along each said corona discharge gas flow path and the electrode spacing for said flow path is maintained substantially constant in the series.

7. A method according to claim 2 comprising the further step of cooling the ozone-containing gas between adjacent corona discharge gas flow paths to remove heat generated along each flow path from said ozone-containing gas before flowing same along the next successive corona discharge gas flow path.

8. A method for generating ozone by corona discharge, comprising the steps of:
   (a) providing a plurality of series-connected corona discharge gas flow paths each between 2.0 and 10 inches in length, bounded by discharge electrodes spaced apart at a distance of between 0.01 and 0.250 inch;
   (b) generating substantially uniform corona along the length of each said gas flow path at power density of between 3.5 and 33 watts/in$^2$ of electrode surface area;
   (c) sequentially flowing an oxygen-containing gas along each said corona discharge gas flow path in series from the inlet end to the outlet end of each for said ozone generation, at flow rate sufficient for the gas flow to remove substantially all of the heat generated by said corona discharge from each said gas flow path, discharging ozone-containing gas from said outlet end of each said gas flow path and introducing same to the next successive gas flow path in the series with discharge of final ozone-containing gas from the outlet end of the final gas flow path in the series, such that the pressure drop over each said gas flow path is maintained between 0.1 and 2 lbs/in$^2$; and (d) cooling the ozone-containing gas between adjacent corona discharge gas flow paths in the series to remove heat generated along each flow path from said ozone-containing gas before flowing same along the next successive corona discharge gas flow path in the series.

9. A method for generating ozone by corona discharge, comprising the steps of:

(a) providing a corona discharge gas flow path between 2.0 and 10 inches in length, bounded by spaced-apart discharge electrodes, with a ratio of the length of said electrodes to the spacing between said electrodes of from 8 to 1000;

(b) generating substantially uniform corona along the length of said gas flow path at power density of between 3.5 and 33 watts/in$^2$ of electrode surface area; and (c) flowing an oxygen-containing gas along said corona discharge gas flow path from the inlet end to the outlet end thereof for said ozone generation, at flow rate sufficient for the gas flow to remove substantially all of the heat generated by said corona discharge from said gas flow path, and discharging ozone-containing gas from said outlet end of said gas flow path, such that the pressure drop over said gas flow path is maintained between 0.1 and 2 lbs/in$^2$.

* * * * *